United States Patent
Franchini et al.

(10) Patent No.: US 9,795,095 B2
(45) Date of Patent: Oct. 24, 2017

(54) VALVE BOX WITH ELECTROVALVES FOR REMOTELY CONTROLLED IRRIGATION SYSTEMS

(71) Applicant: Claber S.p.A., Fiume Veneto (PN) (IT)

(72) Inventors: Gaetano Franchini, Fiume Veneto (IT); D'Agnolo Michela, Vivaro (IT)

(73) Assignee: CLABER S.P.A., Fiume Veneto (PN) (IT)

( * ) Notice: Subject to any disclaimer, the term of this patent is extended or adjusted under 35 U.S.C. 154(b) by 296 days.

(21) Appl. No.: 14/614,452

(22) Filed: Feb. 5, 2015

(65) Prior Publication Data

US 2015/0216133 A1  Aug. 6, 2015

(30) Foreign Application Priority Data

Feb. 5, 2014  (IT) .............. MI20140045 U (51) Int. Cl.
| | | |
|---|---|---|
| *E03B 1/00* | (2006.01) | |
| *A01G 25/16* | (2006.01) | |
| *G05D 7/06* | (2006.01) | |
| *G05B 15/02* | (2006.01) | |
| *F16K 31/40* | (2006.01) | |
| *F16K 11/24* | (2006.01) | |

(Continued)

(52) U.S. Cl.
CPC ............ *A01G 25/165* (2013.01); *F16K 11/24* (2013.01); *F16K 27/003* (2013.01); *F16K 27/12* (2013.01); *F16K 31/404* (2013.01); *G05B 15/02* (2013.01); *G05D 7/0688* (2013.01); *Y10T 137/7043* (2015.04)

(58) Field of Classification Search
CPC ......... Y10T 137/7043; Y10T 137/6995; Y10T 137/86461; Y10T 137/87877; Y10T 137/0491; Y10T 137/6991; Y10T 137/6973; Y10T 137/701; Y10T 137/5987; A01G 25/165; F16K 11/24; F16K 27/003; F16K 27/12; F16K 31/404; G05B 15/02; G05D 7/0688
See application file for complete search history.

(56) References Cited

U.S. PATENT DOCUMENTS

| 4,256,133 A | 3/1981 | Coward et al. |
| 4,858,377 A * | 8/1989 | Oglevee ................ A01G 9/247 |
| | | 165/212 |

(Continued)

FOREIGN PATENT DOCUMENTS

| AU | 2013203518 A1 | 10/2013 |
| EP | 2 522 215 A1 | 11/2012 |

OTHER PUBLICATIONS

European Search Report dated Jun. 25, 2015 issued to a corresponding European patent application, EP 15153660.

*Primary Examiner* — Jessica Cahill
(74) *Attorney, Agent, or Firm* — Jacobson Holman, PLLC (57) ABSTRACT

A valve box for irrigation systems is described, comprising a box-shaped body closed by a lid, and a plurality of electrovalves contained in an inner compartment of said box-shaped body and adapted to allow a fluid from a supply conduit to flow towards a plurality of outlet conduits, each being controlled by an electrovalve. The valve box comprises a single programmable drive and control module of said electrovalves which is contained in a containment box releasably secured above said compartment.

6 Claims, 9 Drawing Sheets

(51) Int. Cl.
    *F16K 27/00*    (2006.01)
    *F16K 27/12*    (2006.01)

(56) References Cited

U.S. PATENT DOCUMENTS

| | | | | |
|---|---|---|---|---|
| 5,245,507 A * | 9/1993 | Ericksen | ................ | H02B 1/28 174/67 |
| 5,560,542 A * | 10/1996 | Reid | ................ | A01G 25/16 239/276 |
| 5,746,250 A * | 5/1998 | Wick | ................ | A01G 25/165 137/382 |
| 5,853,302 A * | 12/1998 | Roman | ................ | H01R 12/721 439/629 |
| 5,908,157 A | 6/1999 | Antonellis et al. | | |
| 6,259,955 B1 * | 7/2001 | Brundisini | ................ | G05B 19/0426 239/69 |
| 2001/0045230 A1 * | 11/2001 | Olson | ................ | A01G 25/16 137/363 |
| 2007/0158458 A1 * | 7/2007 | Wheeler | ................ | A01G 25/00 239/69 |
| 2010/0300549 A1 * | 12/2010 | Altieri | ................ | A01G 25/165 137/1 |
| 2011/0089351 A1 * | 4/2011 | Spadotto | ................ | A01G 25/165 251/129.15 |
| 2012/0290139 A1 * | 11/2012 | Brundisini | ................ | A01G 25/16 700/284 |
| 2013/0211604 A1 * | 8/2013 | Brundisini | ................ | A01G 25/165 700/284 |
| 2015/0088322 A1 * | 3/2015 | Antel | ................ | F16K 27/003 700/284 |

* cited by examiner

VALVE BOX WITH ELECTROVALVES FOR REMOTELY CONTROLLED IRRIGATION SYSTEMS

The present invention relates to a valve box with electrovalves for remotely controlled irrigation systems.

BACKGROUND OF THE INVENTION

Valve boxes for the irrigation of lawns, gardens, flower boxes, and similar spaces are known. Such valve boxes typically comprise a single body, intended to be buried underground, with an inlet and a plurality of outlets for irrigation water. Inside the body, and connected to the inlet, there is a main conduit from which a plurality of outlet conduits emanate, each provided with a solenoid electrovalve which is actuatable in order to selectively control the liquid flow between the inlet and each of the outlets of the irrigation valve box.

Patent Application AU-2013203518, for example, shows a valve box with electrovalves, intended to be buried underground, connected to a remote electronic controller through electric wiring. In particular, a multi-wire electric cable is used, each wire being connected to the terminals of one of the solenoid electrovalves present in the valve box. Through the electronic controller, time-controlled electric signals may be sent to actuate each electrovalve, thus selectively allowing the liquid flow from the inlet conduit to the various outlet conduits.

In such a valve box, the remote physical connection with the electronic controller may result in the degradation of the electric cable and the subsequent malfunctioning of the device. At the same time, the fact that the apparatus comprises two distinct sections (the valve box and the controller) necessarily involves a spaced-apart positioning of the same sections, which will be arranged one externally, and the other one protected against atmospheric agents.

BRIEF SUMMARY OF THE INVENTION

It is the object of the present invention to optimize the control of the electrovalves, while making the apparatus more compact.

In accordance with the present invention, said object is achieved by a valve box for irrigation systems comprising a box-shaped body closed by a lid, and a plurality of electrovalves contained in an inner compartment of said box-shaped body and adapted to allow a fluid from a supply conduit to flow towards a plurality of outlet conduits, each being controlled by an electrovalve, said valve box being characterized in that it comprises a single programmable electronic drive and control module of said electrovalves, which is contained in a containment box releasably secured above said compartment.

BRIEF DESCRIPTION OF SEVERAL VIEWS OF THE DRAWINGS

The features and advantages of the present invention will become apparent from the following detailed description of an embodiment thereof, shown by way of illustrative, non-limiting example in the accompanying drawings, in which.

DETAILED DESCRIPTION OF THE INVENTION

Figure 1:
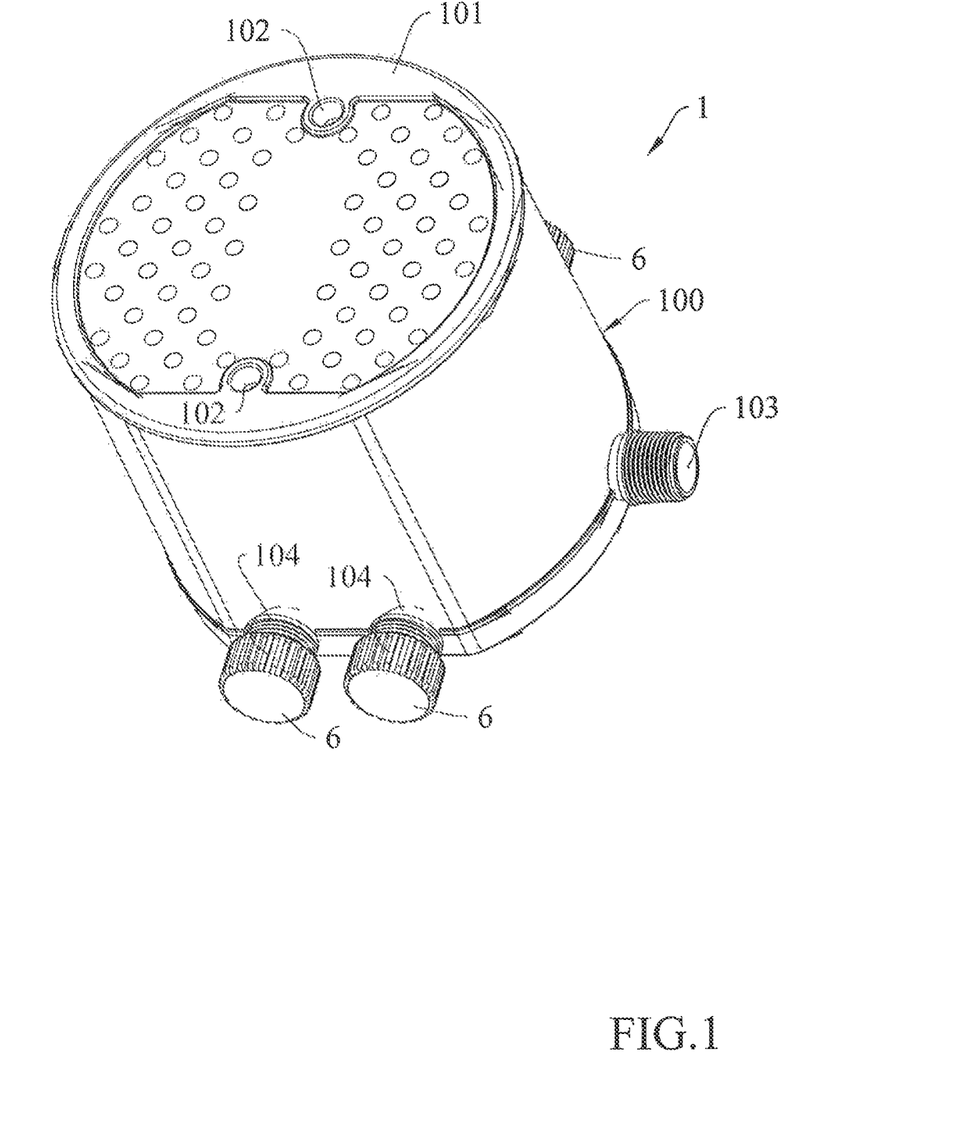
FIG. 1 shows a perspective view of a valve box for irrigation systems according to the present invention.
Figure 2:
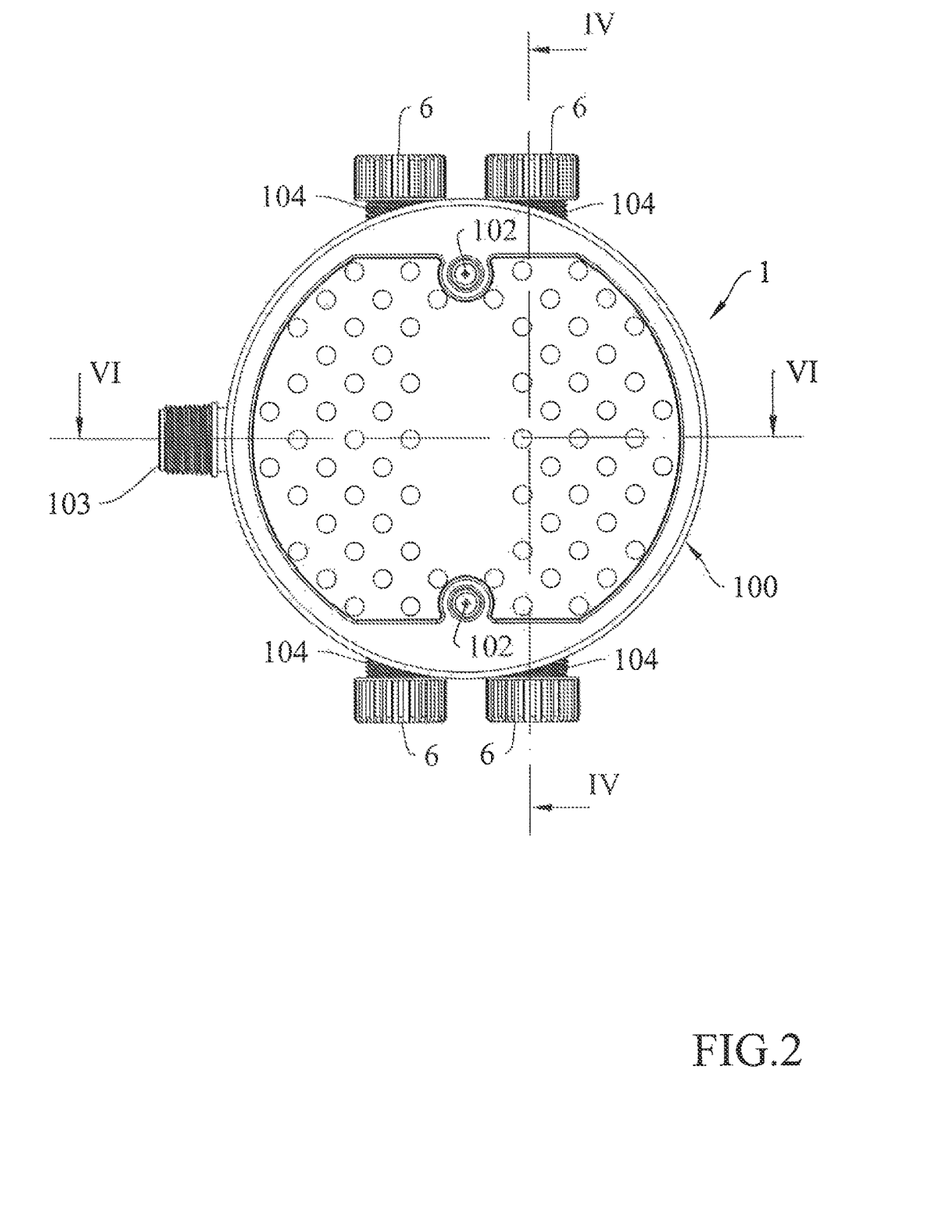
FIG. 2 shows a top view of the valve box for irrigation systems in FIG. 1.
Figure 3:
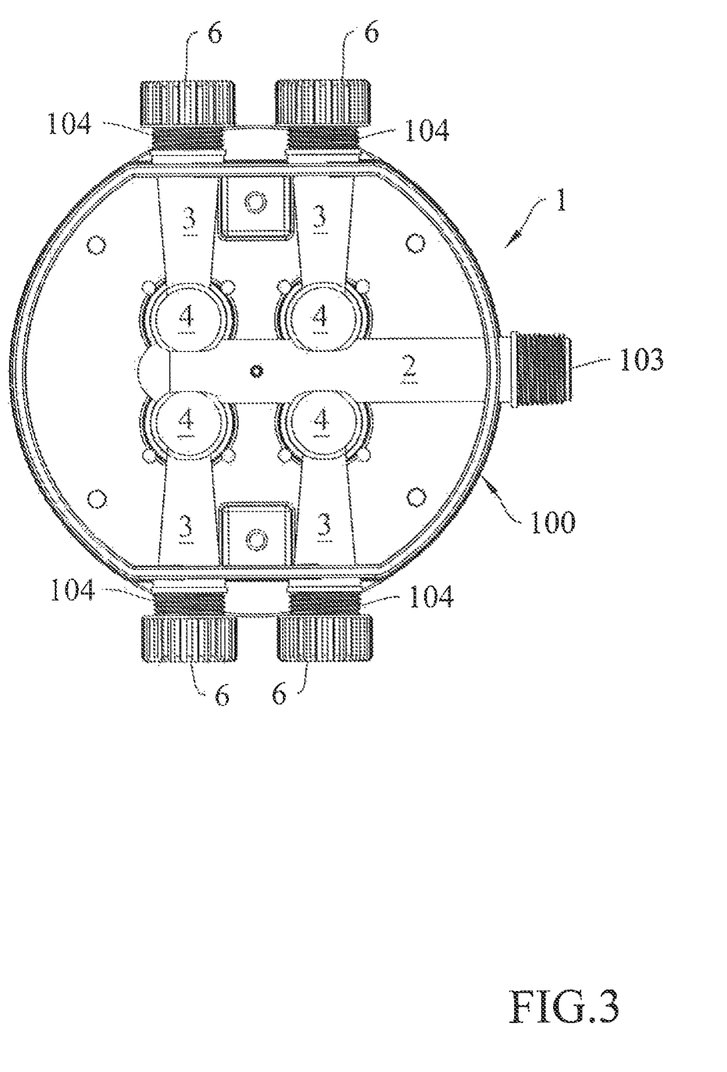
FIG. 3 shows a bottom view of the valve box for irrigation systems in FIG. 1.
Figure 4:
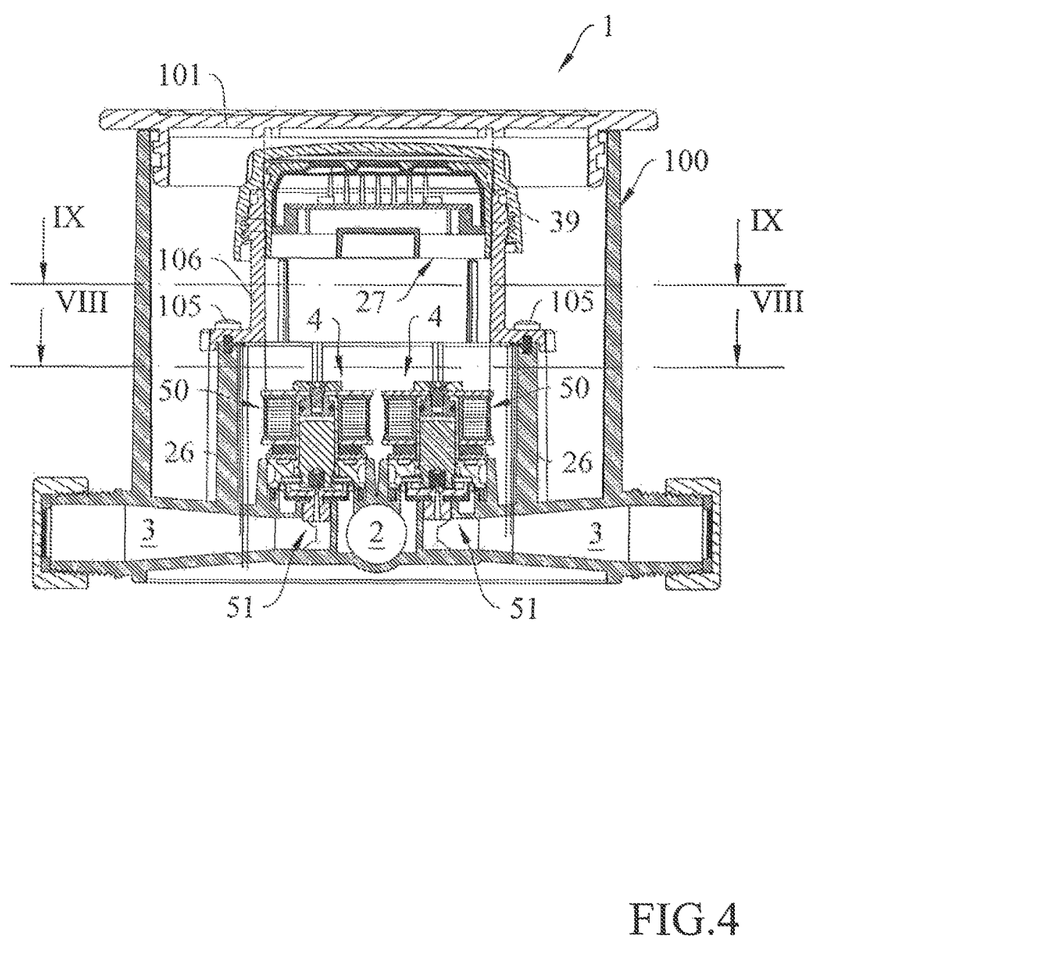
FIG. 4 shows a sectional view of the valve box for irrigation systems taken along the line IV-IV in FIG. 2.
Figure 8:
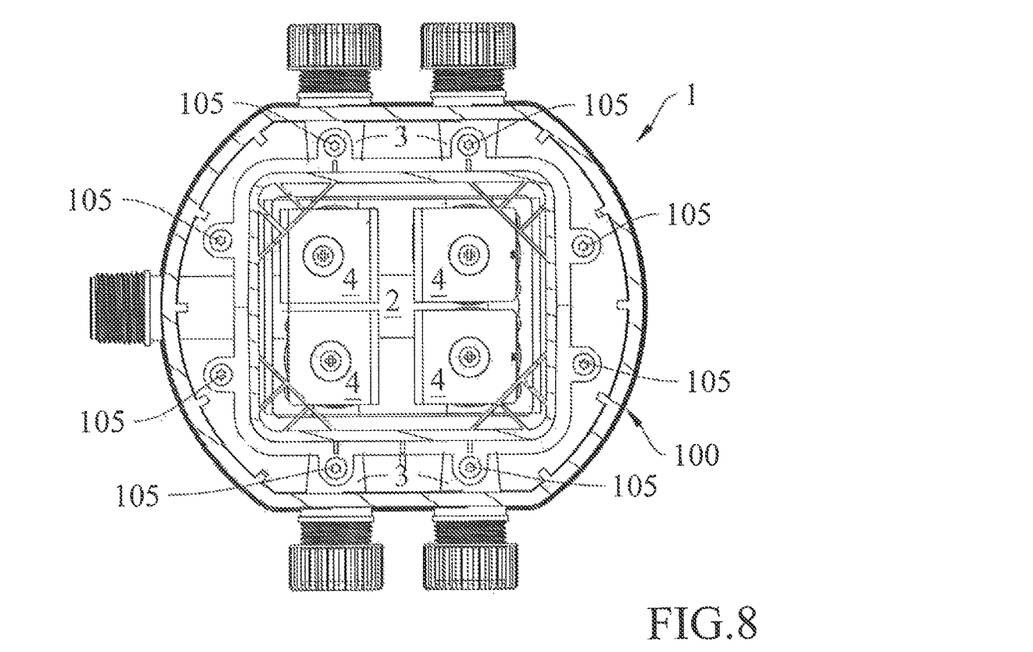
FIG. 8 shows a sectional view of the valve box for irrigation systems, taken along the line VIII-VIII in FIG. 4.
Figure 9:
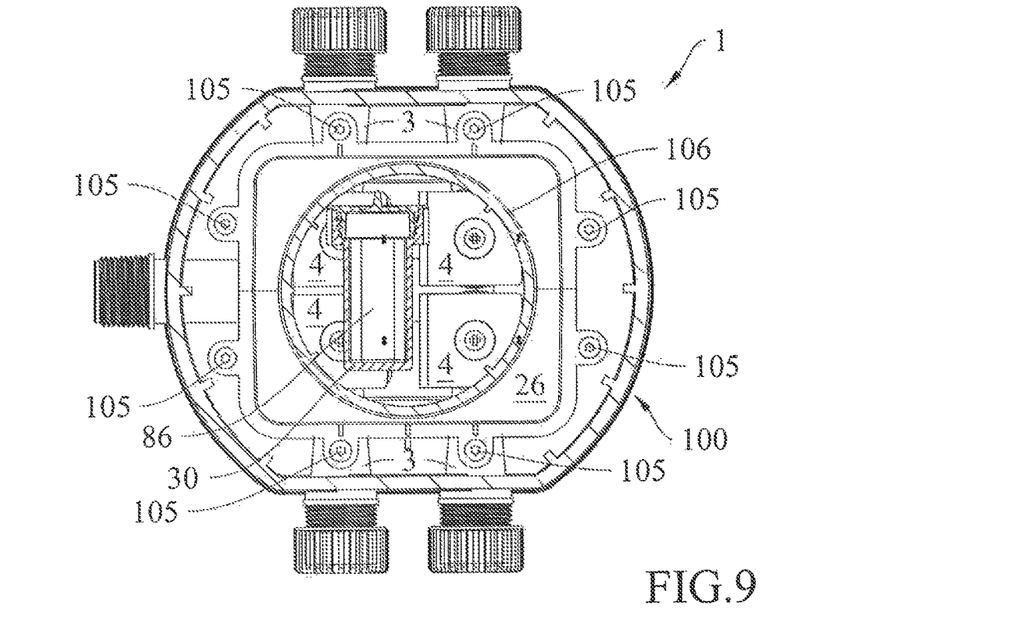
FIG. 9 shows a sectional view of the valve box for irrigation systems, taken along the line IX-IX in FIG. 4.

In FIG. 1, a valve box 1 for irrigation systems is shown, comprising a box-shaped body 100 having a substantially cylindrical shape, which is closed at the top by a lid 101 press-fitted and secured by means of screws 102 (FIG. 2). Inside the box-shaped body 100 (FIG. 4), the irrigation valve box 1 comprises a compartment 26 for a plurality of electrovalves 4, in which a supply conduit 2 and a plurality of outlet conduits 3 are also inserted, said electrovalves 4 being adapted to separately allow a fluid (e.g., water) from the same supply conduit 2 to flow towards the outlet conduits 3 (FIGS. 3, 8, 9). Said supply conduit 2 can be externally accessed through a threaded inlet coupling 103 obtained on an outer portion of the box-shaped body 100 of the supply conduit 2. Likewise, each outlet conduit 3 can be externally accessed through threaded outlet couplings 104.

In particular, each electrovalve 4 is a "solenoid electrovalve" comprising a bistable solenoid 50 in the upper part (FIGS. 4, 5), and a body valve 51 in the lower part. The body valve 51 (FIG. 5) comprises an inner cavity 8 from which a metal insert 9 extends, which is longitudinally crossed by a truncated cone-shaped passageway 10 which, at the upper end, ends in an orifice 11. An elastic membrane 13 couples to insert 9, typically keeping it in the lowered position in FIG. 5, where the membrane 13 resting on a vertical bulkhead 85 closes the communication between the inlet conduit 2 and the outlet conduit 3 which is controlled by that electrovalve.

Figure 5:
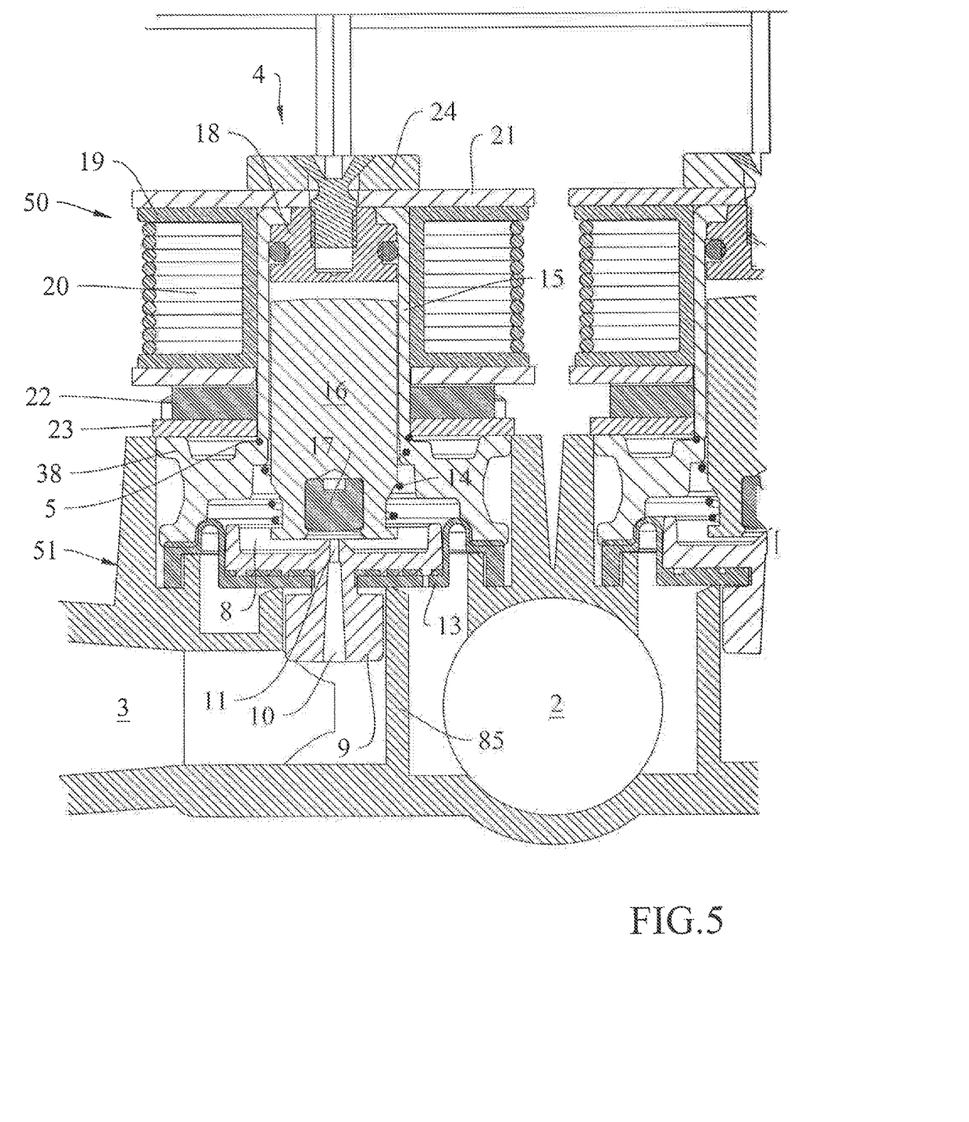
FIG. 5 shows a first detail of the sectional view in FIG. 4.

Above the metal insert 9, a lower end 38 of a metal sleeve 15 (for example, made of steel) extends into the inner cavity 8, in which sleeve a piston 16 is slidably housed, having at the lower end thereof a small sealing block 17 engageable with the upper end orifice 11 and disengageable therefrom to close and open the communication of passageway 10 with the inner cavity 8 of the metal insert 9. A spring 14 acts between an inner shoulder 5 and the lower end of piston 16 to urge piston 16 to the position where the small sealing block 17 is in closing engagement with the upper end orifice 11.

The metal sleeve 15 is secured at the top to an abutment body 18 made of steel, which acts as a limit stop for the ascent of piston 16. About the upper part of the metal sleeve 15 and the abutment body 18, an electrically insulating reel 19 is arranged, which supports an electric coil 20 and which is contained within a C-shaped metal bracket 21 which is, in turn, housed inside electrovalve 4. A permanent magnet 22 and an underlying metal washer 23 are hold in place between the lower tab of the C-shaped metal bracket 21 and the body valve 51.

Two electric, quick-coupling connectors (not shown in the figure) electrically connected to coil 20 laterally extend on the upper part of the body of solenoid 50 for electrically connecting solenoid 50 to a suitable power supply.

The components inside the body of solenoid 50 are detachably secured together by a closing member 24, particularly a "wing screw", reacting against the top of the upper part of solenoid 50 and screwed in an upper cavity of the abutment body 18.

As stated above, spring 14 urges piston 16 to the position where the small sealing block 17 is in a closing engagement with the upper end orifice 11. However, by a command transmitted through the electric connectors, solenoid 50 may switch to a second stable position in which piston 16 is moved into abutment against the abutment body 18, and the small sealing block 17 is then moved away from orifice 11. Thereby, a communication between the cavity 8 and the outlet conduit 3 is created, which relieves the pressure from cavity 8 and allows membrane 13 to move away from bulkhead 85 to open the communication between the supply conduit 2 and the outlet conduit 3 of electrovalve 4. By means of an opposite command, solenoid 50 can then be brought back again to the first stable position and return electrovalve 4 to a closing position by closing orifice 11.

Above compartment 26, a box-shaped body 106 is releasably secured by means of screws 105. The box-shaped body 106 is closed at the top by a transparent lid 39, preferably made of polycarbonate, provided with marks, which is screwed onto the box-shaped body 106 itself with the interposition of an annular sealing gasket 41 housed inside a channel 42 of the upper end of said box-shaped body 106 so as to obtain a lateral sealing coupling with said closing lid 39 (FIG. 7).

The inner part of the box-shaped body 106 and the transparent lid 39 globally form a containment box 106, 39 for a single programmable electronic control module 27 of the electrovalves 4.

Figure 6:
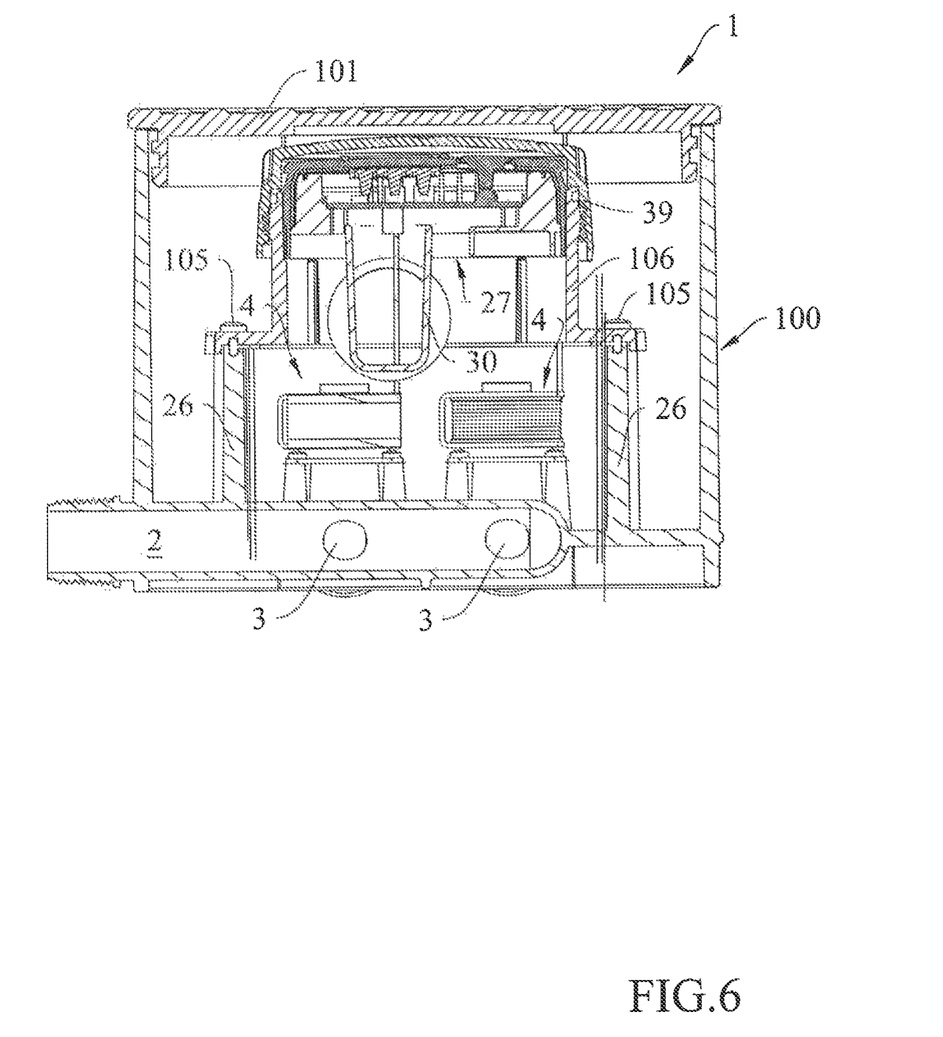
FIG. 6 shows a sectional view of the valve box for irrigation systems, taken along the line VI-VI in FIG. 2.

Said programmable electronic control module 27 of the plurality of electrovalves 4 is adapted to receive and run programs generated or modified by a remote controller, and comprises a resin-based body 28 in which an electronic circuitry with a printed circuit board 29 on top is housed to be watertight (in a non-visible manner) and which further sealingly closes an underlying compartment 30 (FIGS. 6, 9) for housing a supply battery (86 in FIG. 9) which can be externally accessed.

Figure 7:
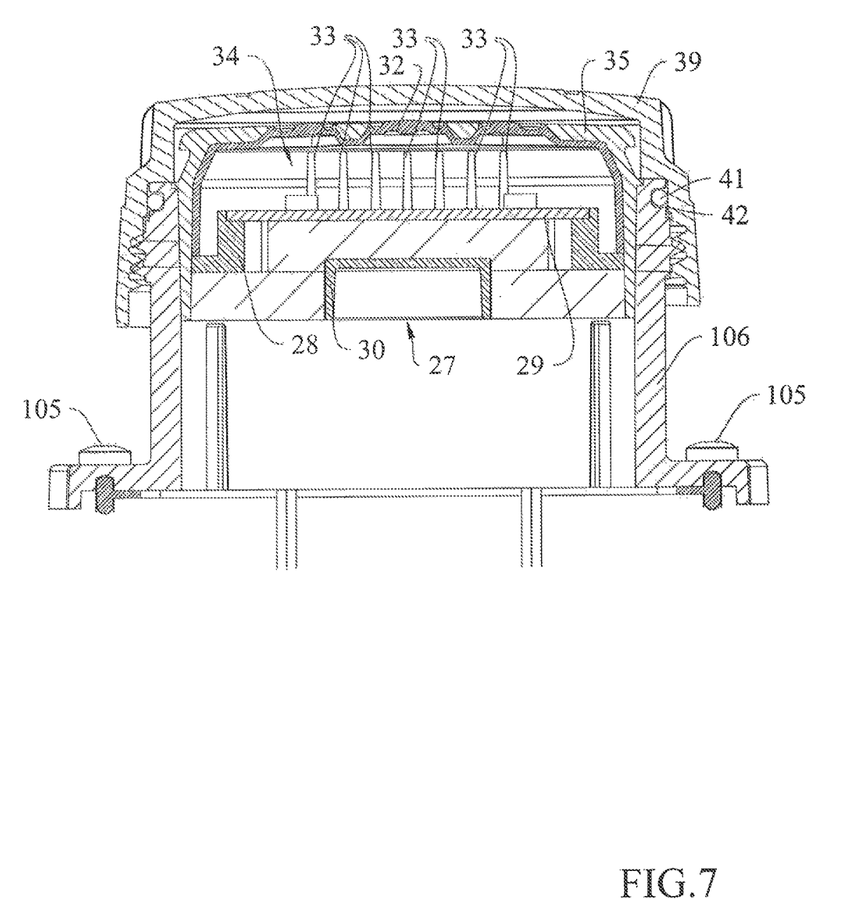
FIG. 7 shows a second detail of the sectional view in FIG. 4.

As shown in FIG. 7, a display 32 is arranged above the printed circuit board 29, while a series of ribs 33 of a small frame 34 extend upwardly from board 29, which ribs serve to support a transparent body 35, preferably made of polycarbonate, also surrounding the resin-based body 28, the printed circuit board 29, and the display 32.

Figure 10:
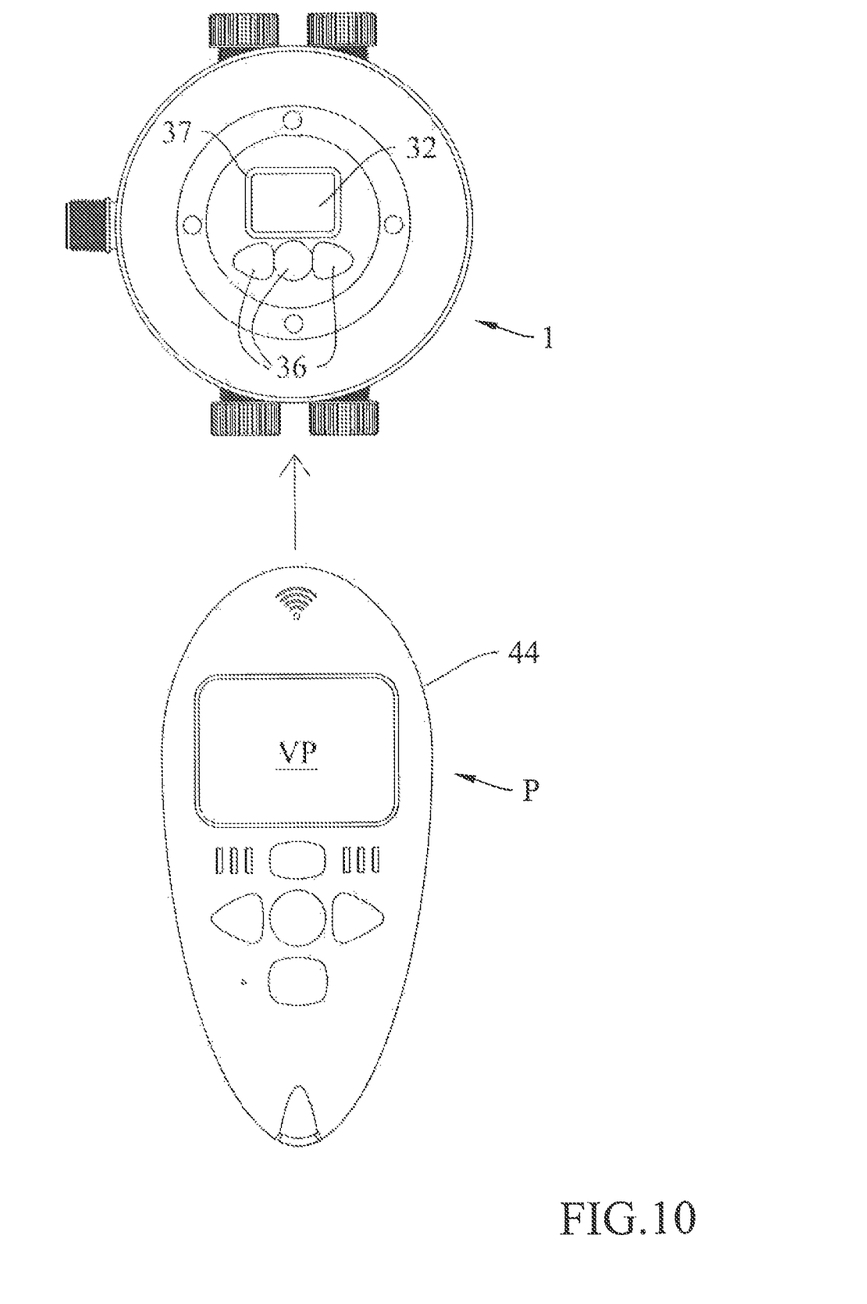
FIG. 10 shows the functional combination of an electronic controller to a valve box for irrigation systems like that shown in the previous figures.

The transparent body 35 has an injection-overmolded keyboard with rubber keys 36 and a framework 37 defining a window for the inspection of display 32 (FIG. 10). A thermoplastic rubber body 38 is interposed between the transparent body 35 and the ribs 33, which is molded together with the transparent body 35.

The drive module 27 is remotely controlled. A wide range of wi-fi implementation types (VPD, radiofrequency, etc.) can be used for remotely programming the above-mentioned programmable electronic drive module 27.

For example, a radiofrequency implementation comprises a centralized controller or remote control P (FIG. 9) which is able to generate radiofrequency programming commands for a plurality of programmable units, such as the drive module 27 inserted in the valve box 1 according to the present invention. Controller P can be, for example, of the type described in EP 2 522 215.

The invention claimed is:

1. A valve box for irrigation systems, comprising a box-shaped body closed by a lid, and a plurality of electrovalves contained in an inner casing inside said box-shaped body and arranged at respective corners of a polygonal space in said inner casing, said plurality of electrovalves being used to allow a fluid from a single supply conduit to flow towards a plurality of outlet conduits, each one of said plurality of outlet conduits being controlled by a respective one of the electrovalve, and a single programmable electronic drive and control module of said plurality of electrovalves which is contained in a containment box releasably and sealingly fastened onto said inner casing, said single programmable electronic drive and control module comprising a resin body for housing an electronic circuitry in a watertight condition, at least one power supply battery that can be accessed from the outside of said resin body, a display overlapping said electronic circuitry, and a transparent body with an overmolded keyboard overlapping said resin body and said display.

2. The valve box for irrigation systems according to claim 1, wherein the valve box further comprise an annular sealing gasket housed within a channel of an upper end of said containment box so as to obtain a lateral sealing coupling with a closing lid of said containment box.

3. The valve box for irrigation systems according to claim 1, wherein each electrovalve of said plurality of electrovalves is a "solenoid electrovalve" comprising a bistable solenoid.

4. The valve box for irrigation systems according to claim 1, wherein the single programmable electronic drive and control module of the electrovalves is adapted to receive and run programs generated or modified by a remote controller.

5. The valve box for irrigation systems according to claim 4, wherein said single programmable electronic drive and control module is radiofrequency programmable.

6. The valve box for irrigation systems according to claim 4, wherein said single programmable electronic drive and control module is vapor pressure deficit (VPD) programmable.

* * * * *